United States Patent [19]

Tateishi

[11] 4,178,691
[45] Dec. 18, 1979

[54] ELECTRONIC DIGITAL SCALE

[75] Inventor: Iwao Tateishi, Yamatokoriyama, Japan

[73] Assignee: Sharp Kabushiki Kaisha, Osaka, Japan

[21] Appl. No.: 819,686

[22] Filed: Jul. 27, 1977

[30] Foreign Application Priority Data

Jul. 30, 1976 [JP] Japan .......................... 51/103762[U]
Jul. 30, 1976 [JP] Japan .......................... 51/103763[U]

[51] Int. Cl.² .............................................. G01B 5/02
[52] U.S. Cl. ................................. 33/139; 235/92 DN; 250/231 R
[58] Field of Search ............. 250/571, 231 SE, 231 R, 250/578; 33/137 R, 138, 139, 140, DIG. 3, 125 R, 125 A, 125 C; 235/92 DN

[56] References Cited

U.S. PATENT DOCUMENTS

| 2,854,753 | 10/1958 | Caparros ................................. 33/139 |
| 3,148,814 | 9/1964 | Studer .......................... 250/231 R X |
| 3,566,477 | 3/1971 | Williams ................................. 33/125 |
| 3,780,440 | 12/1973 | Taylor ..................................... 33/139 |
| 3,967,271 | 6/1976 | Day .......................................... 346/347 P |
| 4,031,360 | 6/1977 | Soule .................................. 33/139 X |
| 4,035,922 | 7/1977 | Voros .............................. 33/DIG. 3 |

Primary Examiner—Joseph W. Hartary
Attorney, Agent, or Firm—Birch, Stewart, Kolasch & Birch

[57] ABSTRACT

A measuring instrument comprising an extensible member and a determining apparatus is provided within an electronic digital scale, said extensible member including sprocket holes arranged at a predetermined interval and said determining apparatus measuring the movement of the extensible member through the use of a movement recognition device. The movement recognition device includes a detection plate for rotating in unison with the movement of said extensible member. The rotation of the detection plate is sensed to generate a length information which is introduced into a computation circuit, whereby a measured result is displayed in a digital display arrangement.

3 Claims, 5 Drawing Figures

ELECTRONIC DIGITAL SCALE

BACKGROUND OF THE INVENTION

The present invention relates to an electronic digital scale, wherein a length is measured through the movement of an extensible member and is indicated in a digital display unit after being processed by computation circuits.

In the past it has been proposed that an electronic digital scale system employ a tape means including a plurality of marks or sprocket holes at predetermined intervals for measuring the length of the tape pulled out of the housing of the electronic digital scale. The length of the tape is determined through the measurement of the number of transited marks or sprocket holes detected at an optical sensing means. However the marks and sprocket holes may be damaged or obstructed by an operator while he handles the tape means including the marks and the sprocket holes, and this prevents the measurement through the use of an optical sensing means.

OBJECTS AND SUMMARY OF THE INVENTION

Accordingly, an object of the present invention is to provide an improved electronic digital scale including a measuring means, said measuring means comprising an extensible member having drive means and a determining means to measure the length of the movement into and out of the housing of the electronic digital scale.

Another object of the present invention is to provide an improved electronic digital scale including a measuring means which is responsible to the movement of an extensible member both in a drawn out direction and the counter direction.

To achieve the above objects, pursuant to an embodiment of the present invention, a measuring means comprising an extensible member and a determining mean is provided, said extensible member including drive means formed at the predetermined interval and said determining means measuring the movement of the extensible member through the use of a movement recognition means.

The movement recognition means includes a detection plate for rotating in unison with the movement of a sprocket means driven by the drive means and an information detecting means for generating length information from the detection plate through the use of marks formed on the detection plate. The length information is introduced into a computation circuit to be operated, and the length information is displayed in a digital display arrangement included within the electronic digital scale. The determining means is responsive to the above movements of the extensible member in the drawn out direction and the counter direction to assure the accuracy of the length information.

Further scope of applicability of the present invention will become apparent from the detailed description given hereinafter. However, it should be understood that the detailed description and specific examples, while indicating perferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention and wherein.

DESCRIPTION OF THE PREFERRED EMBODIMENTS

Figure 1:
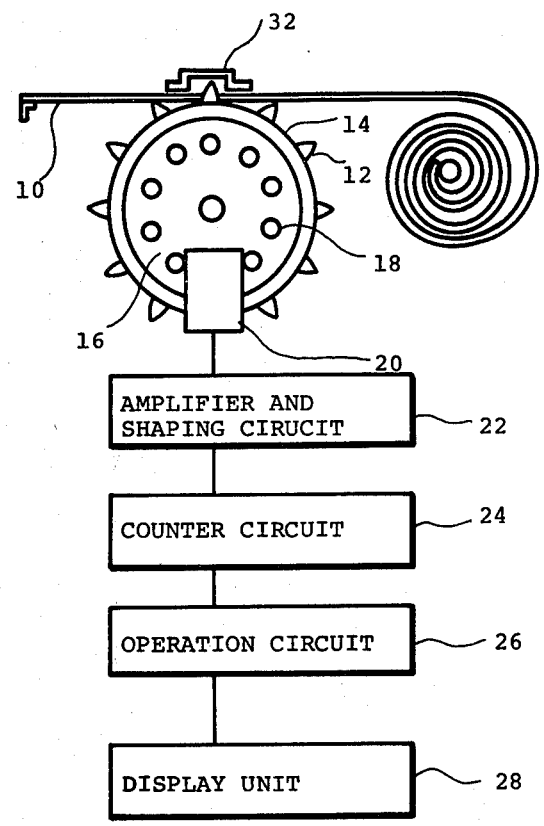
FIG. 1 is an elevational view of a measuring means of an embodiment of the present invention.
Figure 2:
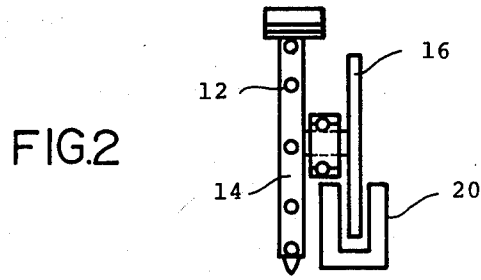
FIG. 2 is a side elevation of the measuring means of FIG. 1.
Figure 3:
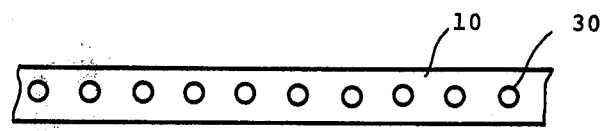
FIG. 3 is an elevational view of a tape means included within the measuring means of FIG. 1 and FIG. 4.
Figure 5:
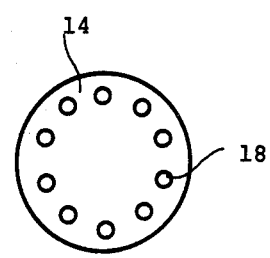
FIG. 5 is an elevational view of a detection plate included within the measuring means of FIG. 1 and FIG. 4.

FIG. 1 and FIG. 2 show a measuring means of an embodiment of the present invention included within an electronic digital scale. FIG. 3 shows a tape means and FIG. 5 shows a detection plate both included within the measuring means.

The measuring means mainly comprises a tape means 10 moved into and out of the housing of the electronic digital scale to measure a desired length, a plurality of sprockets 12 formed around a rotation plate 14, a detection plate 16 for rotating in unison with the rotation plate 14, an opening 18 arranged within the detection plate 16, a sensing means 20 for counting the number of the transited openings 18 detected in accordance with the rotation of the detection plate 16. Length information generated from the sensing means 20 is introduced into an amplifier and shaping circuit 22 to be amplified and shaped, a counter circuit 24 for counting the length information, a computation circuit 26 for computing the length information to determine a length value and a display unit 28 for indicating the length value.

In operation, the tape means 10 including a plurality of sprocket holes 30 spaced at the predetermined intervals is moved into and out of the housing of the electronic digital scale to measure the desired length. The tape means 10 drives the rotation plate 14 through the combination of the sprocket holes 30 and the sprockets 12 while the tape means 10 is travelling on the measuring means, whereby the detection plate 16 is initiated to rotate in unison with the rotation plate 14. The openings 18 arranged in the detection plate 16 transit and are detected by the sensing means 20. Further, the detection plate 16 rotates in unison with the movement of the tape means 10 on the measuring means.

The length information is generated from the sensing means 20 which detects transited openings 18 by an optically recognition means, for example, a photo sensor. The length information is introduced into the amplifier and shaping circuit 22, the counter circuit 24, the computation circuit 26, and the display unit 28, for example, an LED or a liquid crystal display which are well known, respectively.

If a unit interval between the adjacent openings 18 corresponds to a unit interval between adjacent sprocket holes 30, the length information detected by the sensing means 20 can be converted into a measured length through the correlation between the openings 18 and the sprocket holes 30. The length information is introduced into the operation circuit 26 to be multiplied by the ratio between the unit intervals of the sprocket holes 30 and the openings 18 for obtaining the measured length after being amplified and shaped by the amplifier and shaping circuit 22, and being counted by the counter circuit 24. Digital information generated from the computation circuit 26 contains the measured length, said digital information being indicated in the display unit 28.

A protection block 32 is provided on the measuring means for stabilizing the combination of the sprocket holes 30 and the sprockets 12. The opening 18 is replaced by a magnetic mark and a coded mark, wherein a length determination is performed through the use of a magnetic detection means.

Figure 4:
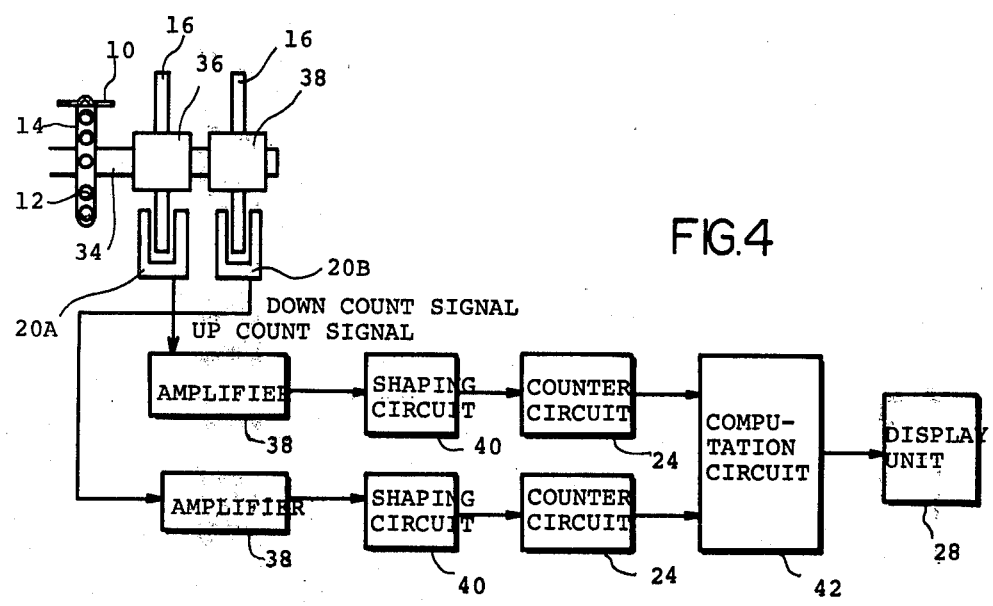
FIG. 4 is a side view of a measuring means of another embodiment of the present invention.

FIG. 4 shows the measuring means of another embodiment of the present invention, wherein two one-way bearings are provided, one of said one-way bearings rotating only in the forward direction of the tape means 10 and the other of said one-way bearings rotating only in the backward direction thereof.

The tape means 10 is combined with the sprocket 12 through the movement of the tape means 10 into and out of the housing of the electronic digital scale, whereby the rotation plate 14 rotates in combination with a shaft 34 which incorporates one-way bearings 36 and 38. The one-way bearings 36 are driven when the tape means 10 moves in the forward direction so that the sensing means 20A develops an up count signal, said one-way bearings 36 being prevented from rotating in the backward movement of the tape means 10. The one-way bearings 38 are driven when the tape means 10 moves in the backward direction so that the sensing means 20B develops a down count signal, said one-way bearings 38 being prevented from rotating in the forward movement of the tape means 10. The one-way bearings 36 and 38 are locked with the shaft 34, respectively. A brake pad (not shown) is provided within the one-way bearings 36 and 38 for braking said bearings 36 and 38 in the non-rotating state. One preferred instrument of the one-way bearings 36 and 38 is a shell type roller-clutch MODEL FC-6 manufactured by NSK TORRINGTON Co.

The detection plates 16 are included within the one-way bearings 36 and 38, respectively, said detection plates 16 having the openings 18. The number of the openings 18 which pass with the rotation of the detection plate 16 is detected through the use of the sensor means 20A and 20B, respectively. The up count signal developed from the sensing means 20A is introduced into an amplfier 38, a shaping circuit 40, the counter circuit 24, and a computation circuit 42. Similarly, the down count signal derived from the sensing means 20B is introduced into the amplifier 38, the shaping circuit 40, the counter circuit 24, and the computation circuit 42.

The computation circuit 42 operates the up count signal and the down count signal to obtain the length measured by the forward and backward movements of the tape means 10. That is, the length information corresponding to the down count signal is subtracted from the length information corresponding to the up count signal. Thus derived length information is displayed on the display unit 28.

No reset means is required in the above system including two one-way bearings 36 and 38 because the down count signal generated through the one-way bearings 38 operates the reset function after the entire tape means 10 is accommodated in the housing of the electronic digital scale.

While only certain embodiments of the present invention have been described, it will be apparent to those skilled in the art that various changes and modifications may be made therein without departing from the spirit and scope of the invention as claimed.

What is claimed is:

1. An electronic digital scale comprising:
    an extensible member adapted to be extended and retracted from a housing of the electronic digital scale;
    a first plate including a plurality of spaced sprockets, said sprockets being adapted to engage said extensible member and rotate in unison with the movement of the extensible member in a forward direction and a backward direction;
    forward movement responsible means driven only in a relationship to the movement of the extensible member in the forward direction;
    means for developing count up information in response to the movement of the forward movement responsible means;
    backward movement responsible means driven only in a relationship to the movement of the extensible member in the backward direction;
    means for developing count down information in response to the movement of the backward movement responsible means;
    a shaft means fixed to said first plate, said forward movement responsible means and said backward movement responsible means such that said forward and backward movement responsible means are driven in unison with said first plate in the forward movement and the backward movement
    a forward counter circuit responsive to said count up information developing means for calculating the count up information;
    a backward counter circuit responsive to said count down information for calculating the count down information; and
    a computation circuit responsive to said forward counter circuit and said backward counter circuit for determining count information corresponding to the count up information and the count down information.

2. An electronic digital scale according to claim 1, wherein said backward movement responsible means comprises a unidirectional bearing and a plate including a plurality of openings therein said openings being spaced to correspond with the spacing of said sprockets on said first plate and a photo sensor means for detecting the transited openings thereby generating a count down signal.

3. An electronic digital scale according to claim 1, wherein said forward movement responsible means comprises a unidirectional bearing and a plate including a plurality of openings therein said openings being spaced to correspond with the spacing of said sprockets on said first plate and a photo sensor means for detecting the transited openings thereby generating a count up signal.

* * * * *